(12) United States Patent
Hu et al.

(10) Patent No.: US 11,669,697 B2
(45) Date of Patent: Jun. 6, 2023

(54) HYBRID POLICY DIALOGUE MANAGER FOR INTELLIGENT PERSONAL ASSISTANTS

(71) Applicant: Bayerische Motoren Werke Aktiengesellschaft, Munich (DE)

(72) Inventors: Wangsu Hu, Chicago, IL (US); Jilei Tian, Chicago, IL (US)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 134 days.

(21) Appl. No.: 16/661,591

(22) Filed: Oct. 23, 2019

(65) Prior Publication Data

US 2021/0124805 A1    Apr. 29, 2021

(51) Int. Cl.
| | |
|---|---|
| *G06F 40/56* | (2020.01) |
| *G10L 15/22* | (2006.01) |
| *G10L 15/26* | (2006.01) |
| *G10L 15/06* | (2013.01) |

(52) U.S. Cl.
CPC ............ *G06F 40/56* (2020.01); *G10L 15/063* (2013.01); *G10L 15/22* (2013.01); *G10L 15/26* (2013.01); *G10L 2015/223* (2013.01)

(58) Field of Classification Search
CPC ....... G10L 15/22; G10L 15/26; G10L 15/063; G10L 2015/223; G10L 13/027; G10L 15/1822; G10L 2015/228; G10L 15/30; G10L 15/19; G06F 40/56; G06F 40/30; G06F 11/3438
See application file for complete search history.

(56) References Cited

U.S. PATENT DOCUMENTS

| | | | | |
|---|---|---|---|---|
| 10,522,138 | B1* | 12/2019 | Sambarino | H04M 3/5175 |
| 2003/0088421 | A1* | 5/2003 | Maes | G10L 15/30 |
| | | | | 704/E15.047 |
| 2011/0060587 | A1* | 3/2011 | Phillips | G10L 15/30 |
| | | | | 704/235 |
| 2014/0297282 | A1* | 10/2014 | Peters | G10L 15/19 |
| | | | | 704/254 |
| 2018/0329878 | A1* | 11/2018 | Hirzel | G06F 40/35 |
| 2018/0341396 | A1* | 11/2018 | Yaseen | G06Q 10/04 |
| 2019/0212879 | A1* | 7/2019 | Anand | G06Q 50/10 |
| 2019/0347326 | A1* | 11/2019 | Kozhaya | G06F 40/35 |
| 2020/0117858 | A1* | 4/2020 | Freeman | G06F 40/35 |

* cited by examiner

*Primary Examiner* — Michael Colucci
(74) *Attorney, Agent, or Firm* — Crowell & Moring LLP

(57) ABSTRACT

A method for providing responsive actions to user inputs in a multi-domain context includes receiving, by a speech-based user interface, a first speech input from a user and converting said first speech input into a text-based representation of the first speech input. A natural language processor processes the text-based representation to determine an intent, entity and internal state of the first speech input. The method further includes determining, by a model-based module based on the intent, entity and internal state, a first data processing policy to apply to the first speech input, wherein the first data processing policy is either a rules-based data processing policy applied by a rules-based module or a statistical model-based data processing policy applied by the model-based module. The first responsive action is generated by the determined first data processing module, and outputted via the speech-based user interface and/or a machine interface.

18 Claims, 5 Drawing Sheets

| dialogue turn | user's utterance | bot's response | Intent recognition | Entity recognition | Slot Filling | Policy model agent | Action prediction |
|---|---|---|---|---|---|---|---|
| 1 | hi | hello how can I help you today | chitchat | - | - | Neural Network | utterance greet |
| 2 | i'd like to book a table | any preference of the cuisine | restaurant | - | - | Neural Network | restaurant task |
|  |  |  |  |  |  | Task Rule (require: cuisine) | utterance ask cuisine |
| 3 | with italian food | where should it be | chitchat | cuisine: italian | restaurant cuisine: italian | Neural Network | restaurant task |
|  |  |  |  |  |  | Task Rule (require: location) | utterance ask location |
| 4 | in Paris for six people | which price range are looking for | chitchat | location: paris, number: six | restaurant location: paris, restaurant number: six | Neural Network | restaurant task |
|  |  |  |  |  |  | Task Rule (require: price) | utterance ask price |
| 5 | what's the weather in London | the weather in london is <weather api response> do you want to continue the restaurant calling | weather | location: london | weather location: london | Neural Network | weather task |
|  |  |  |  |  |  | Task Rule (require: None) | weather task submit |
| 6 | yes | which price range are looking for | affirm | - | - | Neural Network | utterance ask more |
|  |  |  |  |  |  | Neural Network | restaurant task |
|  |  |  |  |  |  | Task Rule (require: price) | utterance ask price |
| 7 | in a cheap price range please | what do you think of this option <restaurant service response> | chitchat | price: cheap | - | Neural Network | restaurant task |
|  |  |  |  |  |  | Task Rule (require: None) | restaurant task submit |
| 8 | sounds great | great, let me do the reservation is there anything else i can help | affirm | - | - | Neural Network | utterance display |
|  |  |  |  |  |  | Neural Network | utterance confirm |
|  |  |  |  |  |  | Neural Network | utterance ask more |
| 9 | no thanks | see you | deny | - | - | Neural Network | utterance bye |

FIG. 4

HYBRID POLICY DIALOGUE MANAGER FOR INTELLIGENT PERSONAL ASSISTANTS

FIELD OF THE INVENTION

The invention relates to a dialogue manager that employs hybrid dialog modeling for use with intelligent personal assistants and, more particularly, to a dialogue manager that is configured to be able to carry out dialogue-based actions and responses, including service-oriented tasks and general dialogue, even in the case of a multi-domain conversation.

BACKGROUND

Intelligent personal assistants use automated dialogue systems that are designed for a specific task, e.g. to book a restaurant, to find out about the weather, etc. Conventionally, trainable dialogue systems are able to be trained from data, taught interactively by supervision. The most important key enablers are natural language understanding and the use of a dialogue manager that includes state tracking and policy modules.

Dialogue managers play the most important role in building an effective dialogue system. A dialogue manager is used to track the internal dialogue state and decide what action to take based on its policy. The dialogue manager is charged with providing appropriate feedbacks to users in a given dialogue context, e.g., asking questions to clearly define a user request, querying knowledge bases or calling APIs, displaying options to users, etc.

Dialogue managers typically employ either a rule-based or model-based policy. Originally, the dialogue manager follows the designed dialogue flow by "rule or template." With such a rule-based policy, the dialogue manager operates according to a fixed set of hard-coded rules. This policy is very effective when the dialogue manager interacts with a machine, such as in the context of calling an API and slot filling information relating to the particular service. However, a rule-based policy requires domain expertise, and dialogue flow becomes quite complicated when the model encounters a situation which does not otherwise conform to a coded rule, such as in the context of an uncooperative user or other unanticipated variations of human conversation.

With a model-based policy, on the other hand, the dialogue manager is trainable by recurrent neural networks, e.g. long-short term memory (LSTM) as it is data-driven and does not follow a fixed set of rules. This policy is effective when interacting with a user in terms of naturalness, flexibility, and extensibility. However, this policy is based on predictions and probabilities and therefore is not error-free, which limits its performance when interacting with a machine, such as service, API, database, etc., which are formally modeled and have strong restriction for calling and querying.

As such, traditional dialogue managers, whether using a rule-based or model-based policy, have drawbacks in the general context in which there is a need to both interact conversationally with a human and to interact with a machine.

One recent system, known as Rasa, purports to use a hybrid policy approach, but nevertheless suffers from significant drawbacks. Specifically, with Rasa a trainable model initially handles and recognizes the task. Once the task is recognized, it enables rule-based processing to complete the task. However, the dialogue flow does not and cannot return to the model-based policy in order to effectively handle a multi-domain conversation, for example, or other unanticipated state, and therefore provides at best only a one-way switch from model-to-rule based dialogue management.

Therefore, there is a need for an efficient hybrid approach that effectively combines both statistical and rule-based dialogue management functionality that also provides for multi-domain user interaction.

SUMMARY OF THE INVENTION

In one embodiment of the invention, a system is configured to provide responsive actions to user inputs in a multi-domain context. The system includes a machine interface and a speech-based user interface configured to receive a first speech input from a user and to convert said first speech input into a text-based representation of the first speech input. The system also includes a natural language processor configured to process the text-based representation, and to determine an intent, entity and internal state of the first speech input based on the processed text-based representation, and a dialogue manager comprising a model-based module and a rules-based module. The model-based module is configured to apply a statistical model-based data processing policy and the rules-based module is configured to apply a rules-based data processing policy.

In certain embodiments, the dialogue manager is configured to determine, by the model-based module based on the intent, entity and internal state, a first data processing policy to apply in generating a first responsive action to the first speech input, wherein the first data processing policy is either the rules-based data processing policy or the model-based data processing policy. A first responsive action is generated according to the determined first data processing policy by a respective one of the rules-based module or model-based module, and output via the speech-based user interface and/or the machine interface.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 4 illustrates one embodiment of the dialogue/action flow diagram of FIG. 3 in the context of a multi-domain conversation.

DESCRIPTION OF EXEMPLARY EMBODIMENTS OF THE INVENTION

Figure 1:
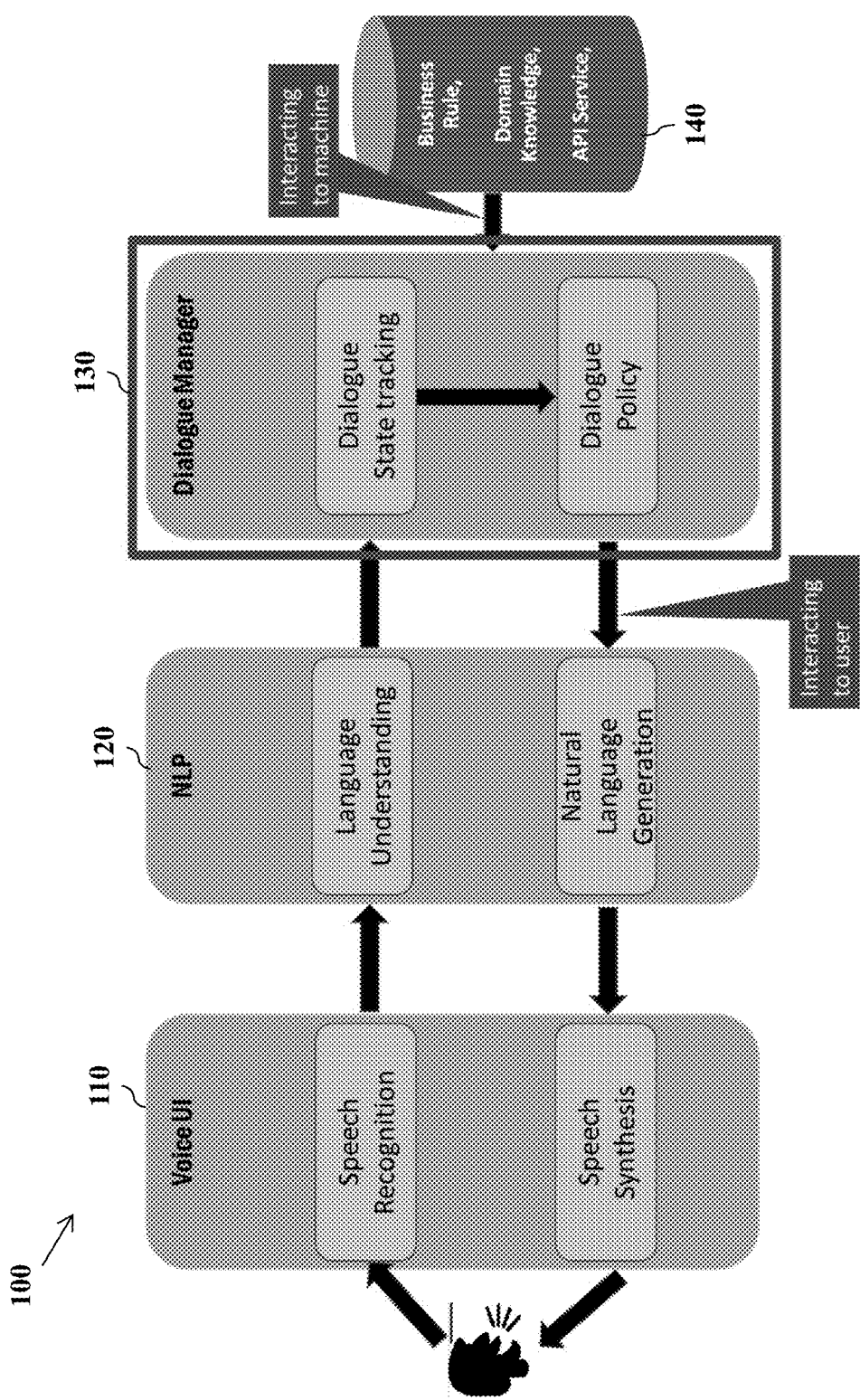
FIG. 1 depicts a dialogue system configured in accordance with the principles of the invention.

One aspect of the invention is to provide an effective and efficient policy modeling for a dialogue manager that masters the dialogue flow in term of both the general task and service-based task.

In particular, a hybrid policy model is disclosed herein which handles general conversation and task-based dialogue. The hybrid policy model enables the dialogue manager to provide a user with a natural response after identifying the intent of a user's utterance, such as uncooperative behavior, chitchat, task change, etc.

It is known that such dialogue can become complicated once the complexity of the conversations grows. For example, a user utterance might be as simple as a word "No," after which the dialogue manager is required to provide some feedback by considering context information, such as dialogue history, internal state tracking, current task, previous action, etc. In this case, training data is used to train the model.

At the same time, the proposed hybrid policy modeling is configured to handle the service-based task dialogue by, for example, applying rule-based slot filling processing to collect mandatory information from a user in order to call an API or other machine-based service in order to complete a given task. The prediction of the dialogue agent's next action is constraint to task-related actions which ask the user to input any required information. Once all the information is collected and slot filling is complete, the dialogue agent answers the user with the result of a complete service call. No training data is needed.

The hybrid policy model disclosed herein enables the dialogue agent to interact with users in terms of having a natural response, while at the same time being able to collect needed information from the user based on a rule-based processing method which interacts with APIs, databases, and other machine-based services. As such, the hybrid policy modeling can significant reduce the amount of training data as well as keeping the conversation naturalness and flexibility to deal with machine and user, respectively.

Furthermore, the disclosed hybrid policy model provides flexibility and extensibility for updating existing service task dialogue and adding new service task dialogue. In other words, disclosed hybrid policy model and dialogue manager further provides the ability to flexibly switch among different tasks as well as effectively process uncooperative turns, human chitchat, task changes, etc., all within the same dialogue session.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment", "certain embodiments", "an embodiment" or similar term means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner on one or more embodiments without limitation.

In accordance with the practices of persons skilled in the art of computer programming, the invention is described below with reference to operations that are performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

The term "server" means a functionally-related group of electrical components, such as a computer system that may or may not be connected to a network and which may include both hardware and software components, or alternatively only the software components that, when executed, carry out certain functions. The "server" may be further integrated with a database management system and one or more associated databases.

In accordance with the descriptions herein, the term "computer readable medium," as used herein, refers to any non-transitory media that participates in providing instructions to a processor for execution. Such a non-transitory medium may take many forms, including but not limited to volatile and non-volatile media. Non-volatile media includes, for example, optical or magnetic disks. Volatile media includes dynamic memory for example and does not include transitory signals, carrier waves, or the like. Common forms of computer-readable media include, for example, a floppy disk, a flexible disk, hard disk, magnetic tape, or any other magnetic medium, a CD-ROM, any other optical medium, punch cards, papertape, any other physical medium with patterns of holes, a RAM, PROM, and EPROM, a FLASH-EPROM, any other memory chip or cartridge, or any other tangible non-transitory medium from which a computer can read.

In addition and further in accordance with the descriptions herein, the term "logic," as used herein, includes hardware, firmware, software in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components.

In addition, the following terminology is used herein:

Intent: a predefined concept to describe how user messages should be categorized, e.g., <'I want to book a table for dinner time for two people'>→intent: restaurant book.

Entity: a predefined concept to describe required pieces of information from a user's message (utterance), e.g., <'I want to book a table for dinner time for two people'>→entity type: party size; entity value: two.

Domain: a predefined concept to describe high-level tasks that the dialogue is aimed to do, e.g., restaurant booking, weather query.

Agent: an API that allows system to train/load/use model such as NLU semantic model and Policy model.

Action: the outcome of an agent (bot), runs in response to user utterance, e.g., response utterance, API call, control command.

Internal State: every user's utterance and bot response in a convention history creates an agent state (e.g. running a bot action, receiving a user message, setting slots) that will be featurized to embed current dialogue (e.g., if intents and entities recognized, which slots are currently defined, the results of any API calls stored in slots, what the last action was, etc.

Slot: a computer memory location that acts as a key-value store which can be used to store information the user provided (e.g., their home city) as well as information gathered about the outside world (e.g. the result of a database query).

Interactive learning: users provide feedback/correction to the bot while talking to it. This is a powerful way to explore what the bot can do, and the easiest way to correct any mistakes the bot makes.

Referring now to the figures, FIG. 1 depicts a dialogue system 100 configured in accordance with the principles of the invention. As shown, a speech-based user interface (UI) 110 receives speech input from a user and converts that speech into text, which can be accomplished using any known speech-to-text technology. The text-based input is then provided to a natural language processor (NLP) 120, which is configured to determine or estimate the user's intent and corresponding entity, and to output the same to the dialogue manager 130. One embodiment for how the NLP 120 may be configured to determine or estimate a user's intent and entity is described in European Patent Application No. 19187537.6, filed on Jul. 22, 2019 and entitled "Multi-domain Trainable Dialogue Solution", the entire disclosure of which is hereby incorporated by reference.

Continuing to refer to FIG. 1, the dialogue manager 130 is configured to provide internal state tracking and to apply either or both of a rules-based and model-based policy. As detailed below, when undertaking a rules-based responsive action, the dialogue manager 130 is configured to interact, via machine interface, with one or more machines 140, such as by calling an API, querying a database, or invoking some other machine-based service, and to carry out the necessary slot filling in connection therewith. Conversely, when undertaking a model-based responsive action, the dialogue manager 130 may be configured to interact with the user via a natural language generator, which may be part of the NLP 120, and which in any event converts a responsive action into a text-based responsive output, which in turn is converted to a speech-based responsive output by a speech synthesis module of the speech-based user interface 110. This model-based speech action can include an answer to a question, a request for additional information, or the like.

Figure 2:
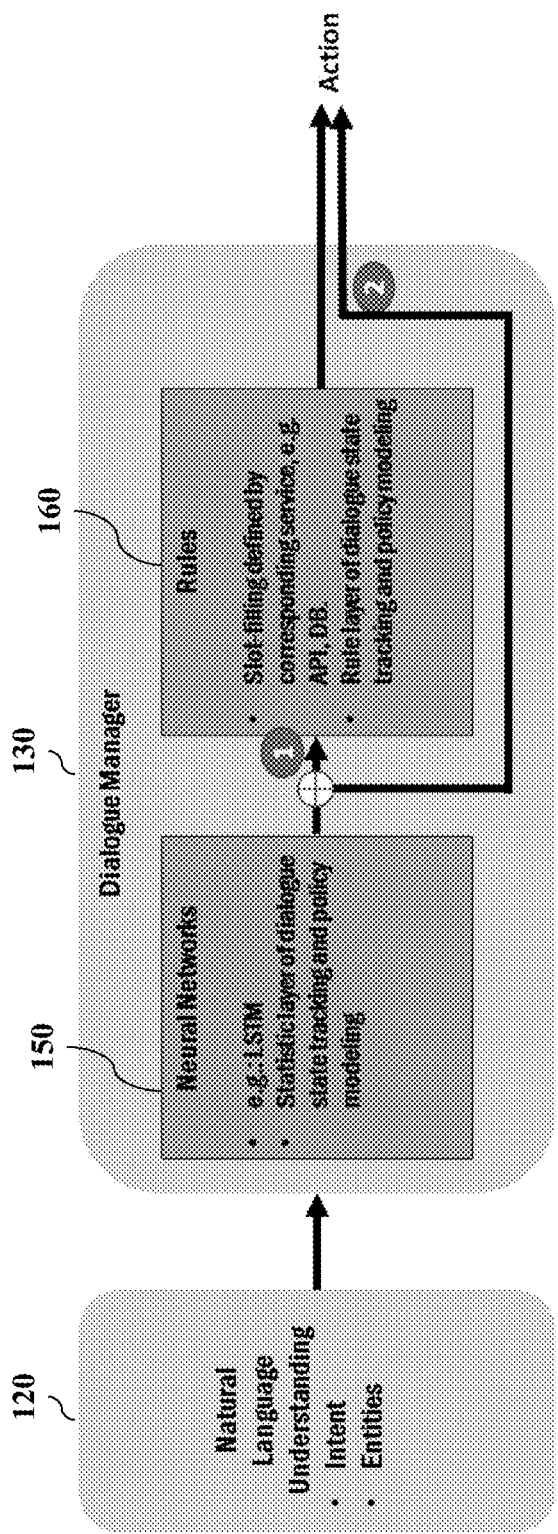
FIG. 2 is another illustration of the natural language processor and dialogue manager of FIG. 1.

Referring now to FIG. 2, depicted is another illustration of the NLP 120 and dialogue manager 130 of FIG. 1. As described above, the NLP 120 determines or estimates the intent and entity of a user's utterance and outputs the same to the dialogue manager 130. In the case of each such user input (e.g., utterance), the dialogue manager 130 processes the intent and entity using a model-based module 150, in this case depicted as one or more neural networks 150, which can be embodied by long-short term memory (LSTM) neural network, a statistics layer of dialogue state tracking and policy modeling, etc. The model-based module 150 is a trainable module which can be trained using dialogue session data, for example, to operate according to statistical probabilities. Moreover, one aspect of the invention is to harness the power of trainable neural network (or functionally similar model-based module) to function as a flow master that directs the dialogue according to the following principles:

For recognized service-based task, the model-based module 150 directs the dialogue to the rules-based module 160 to further process and predict the action constrained by whatever the invoked service needs to complete the task, e.g., ask location, date/time for weather service, etc.

For general dialogue, the model-based module 150 itself predicts the action directly to the user without invoking the rule-based module 160.

In this fashion, the benefits of a model-based policy and rules-based policy are both realized in that user inputs are selectively handling by one or the other. Moreover, since the model-based policy is used to initially process all user inputs, the system notably is able to recognize and handle domain switches by the user, with lower complexity and good prediction accuracy, i.e., one dialogue session can have several domains, e.g. book restaurant and check the weather. The result is that services in several different domains can use the same dialogue system as the domain is defined by system rather than from usage scenario by users. Moreover, the fact that a model-based policy is used to detect domain changes further means that the system achieves improved performance over time with respect to handling multiple simultaneous domains.

The rules-based module 160 of FIG. 2 is configured to receive, from the model-based module 150, a machine-based service call and a set of service-specific parameters (slot fills). If the model-based module 150 determines that additional information is required by the service in question, it will first collect the missing information from the user (e.g., via speech-based UI 110 of FIG. 1) before attempting to call the service.

Figure 3:
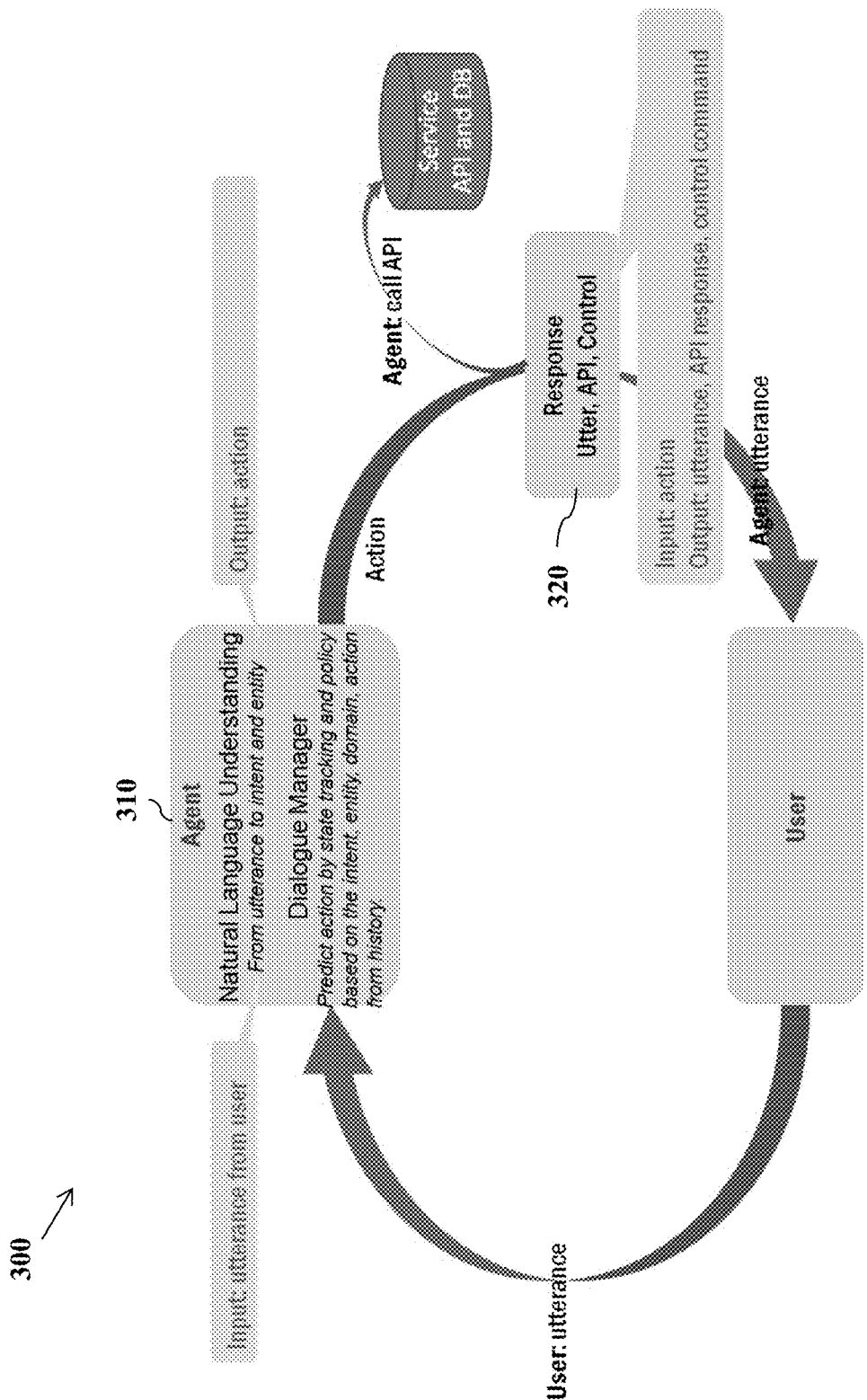
FIG. 3 illustrates a dialogue/action flow diagram in which the dialogue manager of the present disclosure can be used.

Referring now to FIG. 3, illustrated is one embodiment of a dialogue/action flow diagram 300 in which the dialogue manager of the present disclosure can be used. In this case, the dialogue manager is depicted as being integrated with the natural language processor in the form of agent 310, although it should be appreciated that the depicted functionality may be provided by logically and/or physically separate modules.

As shown, the agent 310 takes as an input utterances from a user. From such an utterance, the user's intent and entity are determined using, by way of a non-limiting example, the techniques disclosed in the above-incorporated European Patent Application No. 19187537.6. Based on the identified intent and entity, as well as the current domain and conversation history, an action to be carried out is predicted by the agent 310 and outputted as a logical response 320. It should be appreciated that the response 320 can take the form of an API call, a control command to be sent to a connected system, or an utterance back to the user (e.g., via speech-based UI 110 of FIG. 1).

The dialogue/action flow diagram 300 of FIG. 3 is illustrated in FIG. 4 in the context of a specific example of a how the present dialogue manager can effectively process a multi-domain conversation with a user. As shown, at dialogue turn 1 the system receives a user utters of 'hi' (e.g., via the speech-based UI 110). The intent is recognized as conversation or 'chitchat,' which is processed by the model-based policy (e.g., model-based module 150). Since the dialogue is not task-based, the model-based policy does not call a service or API, or issue a command to a connected system. Rather, the model-based policy predicts the action as an utterance greeting the user in the form of "hello how can I help you today?"

At dialogue turn 2, the user then provides a further utterance, this time requesting a task to be carried out (i.e., "I'd like to book a table"). The dialogue manager predicts the intent, entity and internal state of the utterance, again possibly using the techniques disclosed in the above-incorporated European Patent Application No. 19187537.6. Here, the intent of the "book a table" utterance is restaurant. The dialogue manager recognizes this intent as relating to the 'restaurant task' and recognizes this service requires additional information; namely, cuisine, location, price, etc. The system proceeds to collect the additional information required by the 'restaurant task' by next asking for "any preference of the cuisines."

Continuing to refer to FIG. 4, through dialogue turns 3 and 4, the dialogue manager continues to collect information needed to slot fill the 'restaurant task,' but then is met with an unrelated user utterance at dialogue turn 5. When the user changes the domain from one of restaurant booking to weather information, the dialog manager is able to detect the domain change and the corresponding intent and entity of 'weather' and 'London.' If the restaurant domain dialog had been simply passed off to a rule-based policy, such a domain change would have resulted in a poor user experience with the system likely indicating to the user that it does not understand the user's utterance with regard to weather because it is non-responsive to the question about price range which immediately precedes. However, since each of the user's utterances are first received and processed by the model-based policy, as described above, the system is able to harness the power of statistical model-based policies to process in a multi-domain conversation, while at the same time being able to effectively call responsive machine-based services.

In certain embodiments, the above multi-domain functionality may be enabled using a stack-structure for domain modeling that indicates the current domain of a user's utterance. As detailed in the above-incorporated European Patent Application No. 19187537.6, the stack may be a linear data structure which follows a LIFO (Last In First Out) in which the operations are performed.

At dialog turn 5 of FIG. 4, the system recognizes the intent and entity of 'weather' and 'London,' and carries out the appropriate slot filling for calling the weather API. The system then provides the indicated voice response of "the weather in London is <weather api response>." However, instead of ending the dialogue session, as noted above the dialogue manager of the present invention also maintains the current internal state, as well as a history of the dialogue, including with respect to prior domains. As such, at the conclusion of dialogue turn 5, the dialogue manager prompts the user as to whether he/she would like to continue the restaurant reservation task. After receiving a confirmation from the user at dialogue turn 6 that the user would like to continue with booking a restaurant reservation, the dialog manager continues walking through the reservation process with the user, including finding and displaying a restaurant option which satisfy the user's search criteria (i.e., in Paris, price is cheap, etc.). In the fashion, the dialogue manager of the present disclosure is able to carry out dialogue-based actions and responses, including service-oriented tasks and general dialogue, even in the case of a multi-domain conversation.

Figure 5:
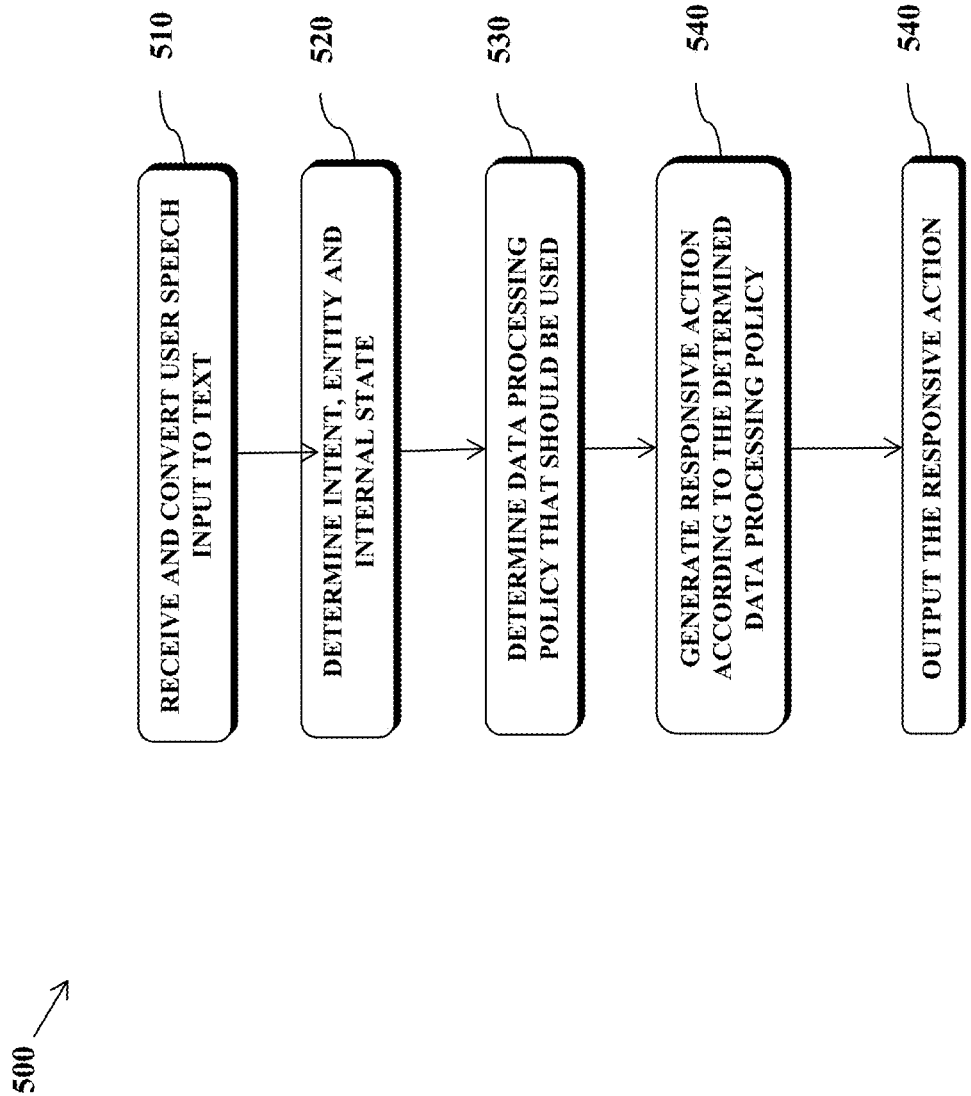
FIG. 5 is one embodiment of a process for carrying out one or more aspects of the invention.

Referring now to FIG. 5, depicted is one embodiment of a process 500 for providing responsive actions to user inputs in a multi-domain context, in accordance with the principles of the invention. Process 500 begins at block 510 where a speech-based user interface receives a first speech input from a user and converts the first speech input into a text-based representation of the first speech input. At block 520, a natural language processor processes the text-based representation to determine an intent, entity and internal state of the first speech input. Then, at block 530, a model-based module determines, based on the intent, entity and internal state, a first data processing policy to apply to the first speech input. In this case, the first data processing policy is either a rules-based data processing policy applied by a rules-based module or a statistical model-based data processing policy applied by the model-based module.

A first responsive action is then generated at block 540 according to the determined first data processing policy by a respective one of the rules-based module or model-based module. Finally, the first responsive action may be outputted via the speech-based user interface and/or a machine interface at block 540.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A computer system configured to provide responsive actions to user inputs in a multi-domain context, the agent comprising:
a machine interface;
a speech-based user interface configured to receive a first speech input from a user and to convert said first speech input into a text-based representation of the first speech input;
a natural language processor configured to process the text-based representation so as to determine an intent, entity and internal state of the first speech input based on the processed text-based representation; and
a dialogue manager comprising a model-based module and a rules-based module, wherein the model-based module is configured to apply a statistical model-based data processing policy in generating the responsive actions by the computer system and the rules-based module is configured to apply a rules-based data processing policy in generating the responsive actions by the computer system, wherein the dialog manager is configured to:
recognize, via the model-based module and from the determined intent, entity and internal state of the first speech input, that the first speech input is one of: a service task and a general dialog, from among the service task and the general dialog, wherein service tasks invoke machine-based services executed by the computer system to complete tasks for the user, and wherein general dialog invokes responsive dialog independent of service tasks,
determine, by the model-based module and according to the recognition of the first speech input as one of: the service task and the general dialog, that a first responsive action to the first speech input is to be generated with a first data processing policy, from among the first data processing policy and a second data processing policy,
wherein the first data processing policy is one of the rules-based data processing policy or the statistical model-based data processing policy,
wherein the second data processing policy is the other of the rules-based data processing policy or the statistical model-based data processing policy,
wherein, in response to recognition of the first speech input as the service task, it is determined that the first responsive action is to be generated by the rules-based module applying the rules-based data processing policy so as to execute the invoked machine-based services, and wherein, in response to recognition of the first speech input as the general dialog, it is determined that the first responsive action is to be generated by the model-based module applying the model-based data processing policy so as to generate the invoked responsive dialog, generate the first responsive action with the first data processing policy, in accordance with the determination, and output the first responsive action via the speech-based user interface and/or the machine interface.

2. The system of claim 1, wherein, when the rules-based module generates the first responsive action, the rules-based module is configured, via the machine interface, to call an API, query a database, and/or or invoke a machine-based service.

3. The system of claim 1, wherein, when the model-based module generates the first responsive action, the model-based module is configured to provide a speech-based responsive output to the user via the speech-based user interface.

4. The system of claim 3, wherein the natural language processor comprises a natural language generator configured to convert the first responsive action into a text-based responsive output, and wherein the speech-based user interface is configured to convert the text-based responsive output into the speech-based responsive output.

5. The system of claim 4, wherein the speech-based responsive output is a request for additional information or a requested piece of information.

6. The system of claim 1, wherein the dialog manager is configured to receive a second speech input from the user, and wherein the model-based module is further configured to detect a domain change from a first domain of the first speech input to a second domain of the second speech input.

7. The system of claim 6, wherein, in the event of a detected domain change, the model-based module is further configured to change the first data processing policy to the second data processing policy in order to generate a second responsive action to the second speech input.

8. The system of claim 7, wherein the dialog manager is further configured to determine if there should be a further domain change from the second domain of the second speech input back to the first domain of the first speech input.

9. The system of claim 8, in the event the dialog manager determines that the further domain change should be made, the dialog manager is further configured to change the second data processing policy back to the first data processing policy and to generate a third responsive action based on the first data processing policy.

10. A method for providing responsive actions by a computer system to user inputs in a multi-domain context, the method comprising:

receiving, by a speech-based user interface, a first speech input from a user and converting said first speech input into a text-based representation of the first speech input;

processing, by a natural language processor, the text-based representation so as to determine an intent, entity and internal state of the first speech input;

recognizing, via a model-based module and from the determined intent, entity and internal state of the first speech input, that the first speech input is one of: a service task and a general dialog, from among the service task and the general dialog, wherein service tasks invoke machine-based services executed by the computer system to complete tasks for the user, and wherein general dialog invokes responsive dialog independent of service tasks;

determining, by the model-based module and according to the recognition of the first speech input as one of: the service task and the general dialog, that a first responsive action to the first speech input is to be generated with a first data processing policy, from among the first data processing policy and a second data processing policy, wherein the first data processing policy is one of a rules-based data processing policy applied by a rules-based module in generating the responsive actions by the computer system or a statistical model-based data processing policy applied by the model-based module in generating the responsive actions by the computer system, wherein the second data processing policy is the other of the rules-based data processing policy or the statistical model-based data processing policy, wherein, in response to recognition of the first speech input as the service task, it is determined that the first responsive action is to be generated by the rules-based module applying the rules-based data processing policy so as to execute the invoked machine-based services, and wherein, in response to recognition of the first speech input as the general dialog, it is determined that the first responsive action is to be generated by the model-based module applying the model-based data processing policy so as to generate the invoked responsive dialog;

generating the first responsive action with the first data processing policy, in accordance with the determination; and outputting the first responsive action via the speech-based user interface and/or a machine interface.

11. The method of claim 10, wherein, when the first data processing module is the rules-based module, generating the first responsive action comprises calling an API, querying a database, and/or invoking a machine-based service, in each case via the machine interface.

12. The method of claim 10, wherein, when first data processing module is the model-based module, generating the first responsive action comprises providing a speech-based responsive output to the user via the speech-based user interface.

13. The method of claim 12, further comprising:

converting, by a natural language processor, the first responsive action into a text-based responsive output; and converting, by the speech-based user interface, the text-based responsive output into the speech-based responsive output.

14. The method of claim 13, wherein the speech-based responsive output is a request for additional information or a requested piece of information.

15. The method of claim 10, further comprising:

receiving, by the speech-based user interface, a second speech input from the user;

detecting, by the model-based module, a domain change from a first domain of the first speech input to a second domain of the second speech input.

16. The method of claim 15, wherein, in response to detecting the domain change, the method further comprises changing, by the model-based module, the first data processing policy to the second data processing policy in order to generate a second responsive action to the second speech input.

17. The method of claim 16, further comprising determining if there should be a further domain change from the second domain of the second speech input back to the first domain of the first speech input.

18. The method of claim 17, in response to determining that the further domain change should be made, the method further comprises changing the second data processing policy back to the first data processing policy in order to generate a third responsive action based on the first data processing policy.

* * * * *